United States Patent
Carriero

(10) Patent No.: US 12,065,329 B2
(45) Date of Patent: Aug. 20, 2024

(54) REAL-TIME DATA COMMUNICATION FOR ELEVATOR SYSTEM

(71) Applicant: INVENTIO AG, Hergiswil (CH)

(72) Inventor: Stefano Carriero, Cham (CH)

(73) Assignee: Inventio AG, Hergiswil (CH)

( * ) Notice: Subject to any disclaimer, the term of this patent is extended or adjusted under 35 U.S.C. 154(b) by 1434 days.

(21) Appl. No.: 16/478,423

(22) PCT Filed: Jan. 16, 2018

(86) PCT No.: PCT/EP2018/051019
§ 371 (c)(1),
(2) Date: Jul. 16, 2019

(87) PCT Pub. No.: WO2018/134205
PCT Pub. Date: Jul. 26, 2018

(65) Prior Publication Data
US 2020/0062539 A1    Feb. 27, 2020

(30) Foreign Application Priority Data

Jan. 17, 2017   (EP) .................................. 17151861

(51) Int. Cl.
*B66B 1/34*      (2006.01)
*B66B 1/50*      (2006.01)
(Continued)

(52) U.S. Cl.
CPC .......... *B66B 1/3453* (2013.01); *B66B 1/3461* (2013.01); *B66B 1/50* (2013.01);
(Continued)

(58) Field of Classification Search
CPC ....... B66B 1/3453; B66B 1/3461; B66B 1/50; B66B 3/002; B66B 5/0012; B66B 5/0018;
(Continued)

(56) References Cited

U.S. PATENT DOCUMENTS

| 6,615,175 B1 * | 9/2003 | Gazdzinski | ............. B66B 3/006 |
| | | | 704/E15.045 |
| 2009/0133969 A1 * | 5/2009 | Zaharia | ................... B66B 1/468 |
| | | | 187/388 |

(Continued)

FOREIGN PATENT DOCUMENTS

| JP | 2004142924 | 5/2004 |
| KR | 2012 0078340 | 7/2012 |

(Continued)

OTHER PUBLICATIONS

Zhihong Lin. "Industrial automation components." Nov. 21, 2013. Retrieved from the internet. URL:http://www.ti.com/lit/wp/spry254/spry254.pdf.

(Continued)

*Primary Examiner* — Jeffrey Donels
(74) *Attorney, Agent, or Firm* — Knobbe, Martens, Olson & Bear, LLP

(57) ABSTRACT

A method for controlling an elevator system comprises receiving media data, receiving at least one of control data and sensor data, transmitting the media data and at least one of the control data and sensor data via a real-time data communication network between a central controller adapted for controlling a drive of the elevator system and a local controller, the local controller being provided in one of an elevator car control panel and a door control panel, wherein the real-time data communication network is adapted for transmitting data packets while ensuring that a data packet is transmitted during a maximal transmission time.

15 Claims, 3 Drawing Sheets

(51) Int. Cl.
*B66B 3/00* (2006.01)
*B66B 5/00* (2006.01)
*B66B 9/00* (2006.01)
*H04L 12/40* (2006.01)
*H04L 12/403* (2006.01)
*H04L 65/1069* (2022.01)
*H04L 67/12* (2022.01)

(52) U.S. Cl.
CPC ............ *B66B 3/002* (2013.01); *B66B 5/0012* (2013.01); *B66B 5/0018* (2013.01); *B66B 9/00* (2013.01); *H04L 12/403* (2013.01); *H04L 65/1069* (2013.01); *H04L 67/12* (2013.01); *H04L 2012/40208* (2013.01)

(58) Field of Classification Search
CPC ..... B66B 9/00; H04L 12/403; H04L 65/1069; H04L 67/12; H04L 2012/40208
See application file for complete search history.

(56) References Cited

U.S. PATENT DOCUMENTS

| | | | | |
|---|---|---|---|---|
| 2010/0217669 A1* | 8/2010 | Gazdzinski | ............. | G06F 3/044 |
| | | | | 345/173 |
| 2012/0217889 A1* | 8/2012 | Jayabalan | .............. | H05B 45/14 |
| | | | | 315/209 R |
| 2015/0251875 A1* | 9/2015 | Lustenberger | ........ | B66B 5/0031 |
| | | | | 700/275 |

FOREIGN PATENT DOCUMENTS

| WO | WO 2006/101316 | 9/2006 |
|---|---|---|
| WO | WO 2013/151533 | 10/2013 |

OTHER PUBLICATIONS

International Search Report for International Application No. PCT/EP2018/051019 dated Apr. 10, 2018.

* cited by examiner

REAL-TIME DATA COMMUNICATION FOR ELEVATOR SYSTEM

TECHNICAL FIELD

The present disclosure relates to a method for controlling an elevator system, a control system of an elevator and to an elevator system.

SUMMARY

An elevator system usually comprises an elevator car, which is accessible via several doors into an elevator shaft. Inside the elevator car and near the elevator doors, e.g., at the landing floors, several control panels are arranged, which, for example, serve for calling the elevator car, displaying the actual position of the elevator car, communication with external service personal, etc. These control panels are communicatively interconnected with a central controller, which is responsible for controlling the drive of the elevator car. Furthermore, a plurality of local controllers and/or further devices are interconnected with the central controller, which, for example, send measurement signals to the central controller and/or distribute control signals to equipment remote from the drive.

For establishing above mentioned communication, currently elevator systems are equipped with several different fieldbuses and a multitude of wires between the elevator car, the central controller and the landing floors. This may lead to high material costs, high installation effort and a high complexity and cost for maintenance/repair work.

For example, there are different technologies used for the communication between the central controller and the elevator car. Usually, the connection between the central controller and the elevator car is based on a so-called travelling cable, which currently includes the wires for different types of technologies such as shielded wires, twisted pair wires, etc.

For example, a camera, an alarm system for calling an external operator, and an information display may have separate bus systems, respectively. Other information that may be transmitted via the travelling cable and further cables to the door control panels may include hoistway information, such as the car position, alarm and intercommunication signals, signals for a floor level indicator, safety signals (e.g., doors are all closed), etc.

US 2012 0 217 889 A1 discloses a control system for an elevator. A speech recognition and synthesis systems and input device(s) are operatively coupled to a processor and storage devices. Each elevator car is connected to a LAN, WAN, intranet, or Internet, and may be capable of exchanging data with and retrieving data therefrom.

WO 2013 151 533 A1 discloses an elevator control system comprising a CAN (controller area network) bus for interconnecting elevator cars.

There may be a need for a reliable, fast and simple communication system interconnecting the central controller of an elevator system with subcomponents of the elevator system, such as the elevator car and/or door control panels.

Such a need may be met with the subject-matter of the independent claims. Advantageous embodiments are defined in the dependent claims.

Embodiments of the present disclosure may be interpreted as being based, inter alia, on the following observations and recognitions.

An aspect of the disclosure relates to a method for controlling an elevator system. For example, the method may be performed by a control system of the elevator system. It has to be noted that an elevator system may be every system adapted for transporting persons and/or goods vertically in a shaft. In general, an elevator system may comprise an elevator car that moves vertically in the shaft.

According to an embodiment of the disclosure, the method comprises: receiving media data; receiving at least one of control data and sensor data; and transmitting the media data and at least one of the control data and sensor data via a real-time data communication network between a central controller adapted for controlling a drive of the elevator system and a local controller, the local controller being provided in one of an elevator car control panel and a door control panel.

In some instances, it may be seen as a gist of the disclosure that the central controller of the elevator system, which usually is provided near the drive, which, for example, may be an electrical motor, is connected via a real-time data communication network with one or more local controllers of the elevator system. A local controller may be any control device used for controlling and/or operating components of the elevator system, which are remote from the central controller. For example, the local controller may be a controller inside an elevator car control panel and/or the local controller may be a controller inside a door control panel.

The elevator control panel may provide buttons for selecting a floor, may comprise and/or may be connected to a microphone, a camera and/or a display inside the elevator car. A door control panel may comprise one or more buttons for calling an elevator and/or may comprise and/or may be connected to a microphone, a camera and/or a display in the corresponding floor, for example besides or above the corresponding elevator door.

With the real-time data communication network, not only digitized media data, such as voice data, sound data, image data, video data, etc., may be transmitted, but also control data and sensor data. In other words, the same communication line may be used for transmitting time-critical and non-time-critical data. For example, voice data generated inside the elevator car may be transmitted to the central controller via the same communication line as, for example, signals from a door closed sensor and/or a floor number indication signal from the central controller.

It has to be noted that a real-time data communication network may be characterized in that it is adapted for transmitting data packets while ensuring that a data packet is transmitted during a maximal transmission time. In other words, a sender connected to the real-time data communication network may be sure that a data packet sent will arrive at the receiver in less than a predefined time interval, such as less than 10 microseconds. In such a way, it may be ensured that time-critical data, such as sensor data and control data, will arrive within time. On the other hand, since non-time-critical data, such as video data from a security camera, is also sent over the same communication line, complicated cabling and different communication interfaces may be omitted. An integration of different bus systems into one real-time data communication network may save costs and may facilitate maintenance.

The real-time data communication network may have any topology. In particular, the real-time data communication network may be based on a bus system, such as an Ethernet bus system or Ethernet fieldbus.

The central controller and each of the one or more local controllers may be provided with a programmable embedded processor and/or system, which may be adapted for sending and/or receiving data packets via the real-time data communication network. The different data (media data, sensor data, control data) may be encoded and/or decoded with this processor and/or system into and/or from data packets for the real-time data communication network. In such a way, the different data may be transmitted and edited or executed compatibly in real-time.

To transmit all data, the real-time data communication network may provide enough bandwidth to transmit media data and control/sensor data nearly simultaneously in real-time. For example, the real-time data communication network may have a bandwidth of more than 10 Mbits/s, such as 100 Mbits/s.

According to an embodiment of the disclosure, an Internet connection is established via the real-time data communication network and the media data is transmitted via the Internet connection. It may be that media data is transported via an Internet protocol that is established on top of the communication protocol of the the real-time data communication network. The other data, e.g., sensor data and/or control data, may be transmitted directly with the protocol of the the real-time data communication network.

According to an embodiment of the disclosure, the media data comprises at least one of sound data, voice data, image data, video data. Media data may be seen as data that has been encoded from signals that may be directly perceived by a human being. Contrary to this control data and sensor data is data that is intended to be evaluated by devices.

According to an embodiment of the disclosure, media data is generated in the elevator car and transmitted from the local controller of the elevator car control panel to the central controller. For example, a person in the elevator car may speak into a microphone and/or a camera inside the elevator car may observe the interior of the elevator car. The received signals then may be encoded into media data and then into data packets sent via the real-time data communication network to the central controller. For example, the central controller may transmit this media data to external systems, for example, via Internet.

According to an embodiment of the disclosure, media data is generated by the door control panel and transmitted from the local controller of the door control panel to the central controller. It also may be possible that the door control panel receives signals from a microphone and/or a camera in the corresponding floor. Also in this case, the received signals then may be encoded into media data and then into data packets sent via the real-time data communication network to the central controller.

According to an embodiment of the disclosure, the control data and/or sensor data is generated in the elevator car and transmitted from the local controller of the elevator car control panel to the central controller. Additionally, the control data and/or sensor data is transmitted from the local controller of the door control panel to the central controller. Analogously, sensor and control data may be processed in this way, generated control signals (for example, a floor selection signal) and/or received sensor signals (for example, from a door closed sensor) may be encoded into control and sensor data and afterwards may be encoded into data packets to be sent via the real-time data communication network.

According to an embodiment of the disclosure, the control data is generated by the central controller and transmitted to the local controller of the door control panel and/or the elevator car control panel. On the other hand, also control data from the central controller may be transmitted to the local controllers.

According to an embodiment of the disclosure, the media data is received and/or generated by the central controller and transmitted to the local controller of the door control panel and/or the elevator car control panel. For example, media data from the Internet, such as VoIP (voice over IP) data, may be received by the central controller and transmitted, for example, to the elevator car. It also may be possible that media data from a local controller is transmitted to the central controller and from there to another local controller.

According to an embodiment of the disclosure, the central controller comprises an Internet gateway for receiving media data from the Internet and/or for sending media data into the Internet. As already mentioned, the central controller may establish a communication connection from local controllers to the Internet. As an example, a VoIP connection with an external SIP server may be established between the elevator car control panel and/or the door control panel.

According to an embodiment of the disclosure, media data from a local controller transmitted via the real-time data communication network is sent by the central controller into the Internet. Another possibility is that, for example, video data from one or more security cameras is sent from local controllers to the central controllers via the real-time data communication network. The central controller then may send this data to an external server, for example, of a building security system.

According to an embodiment of the disclosure, the door control panel and/or the elevator car control panel displays image data and/or video data received via the real-time data communication network. Furthermore, the door control panel and/or the elevator car control panel may play voice data and/or sound data received via the real-time data communication network. On the other hand, external media data, for example encoding music to be played in the elevator car, may be transmitted to a local controller.

According to an embodiment of the disclosure, voice data and/or sound data is encoded from a signal of a microphone. Also, image data and/or video data may be encoded from a signal of a camera. For example, the microphone and/or camera may be connected and/or integrated into the elevator car control panel and/or the door control panel. The corresponding control panel may encode the received signals into data packets transmitted via the real-time data communication network.

According to an embodiment of the disclosure, the real-time communication network is an EtherCAT© or a PROFInet-IR© network. However, other types of real-time data communication networks are not excluded.

A further aspect of the disclosure relates to a control system of an elevator. For example, the control system may be adapted for performing the method as described in the above and in the below.

According to an embodiment of the disclosure, the control system comprises a central controller adapted for controlling a drive of the elevator system; at least one local controller being provided in at least one of an elevator car control panel and a door control panel; and a real-time data communication network interconnecting the central controller and the local controller. Each of the central controller and the one or more local controllers may comprise an embedded device (e.g., a processor or system) adapted for establishing communication via the real-time data communication network.

A further aspect of the disclosure relates to an elevator system, which comprises an elevator car movable in an elevator shaft and driven by a drive; an elevator car control panel; at least one door control panel at an elevator door; and a control system as described in the above and in the below. For example, the elevator system may comprise a microphone and/or a camera, wherein one of the local controllers is adapted for encoding media data from the microphone and/or from the camera and for sending the media data to the central controller. Furthermore, the elevator system may comprise a display device and/or a loudspeaker, wherein one of the local controllers is adapted for receiving media data from the central controller and for decoding the media data into data and/or signals to be processed by the display device and/or the loudspeaker.

According to an embodiment of the disclosure, the real-time data communication network comprises a fieldbus interconnecting the central controller with a local controller in the elevator car and/or a fieldbus interconnecting the central controller with a plurality of door control panels. In such a way, the complete data communication of the elevator system may be performed with only two cables.

BRIEF DESCRIPTION OF THE DRAWINGS

In the following, advantageous embodiments of the disclosure will be described with reference to the enclosed drawings. However, neither the drawings nor the description shall be interpreted as limiting the disclosure.

The figures are only schematic and not to scale. Same reference signs refer to same or similar features.

DETAILED DESCRIPTION

Figure 1:
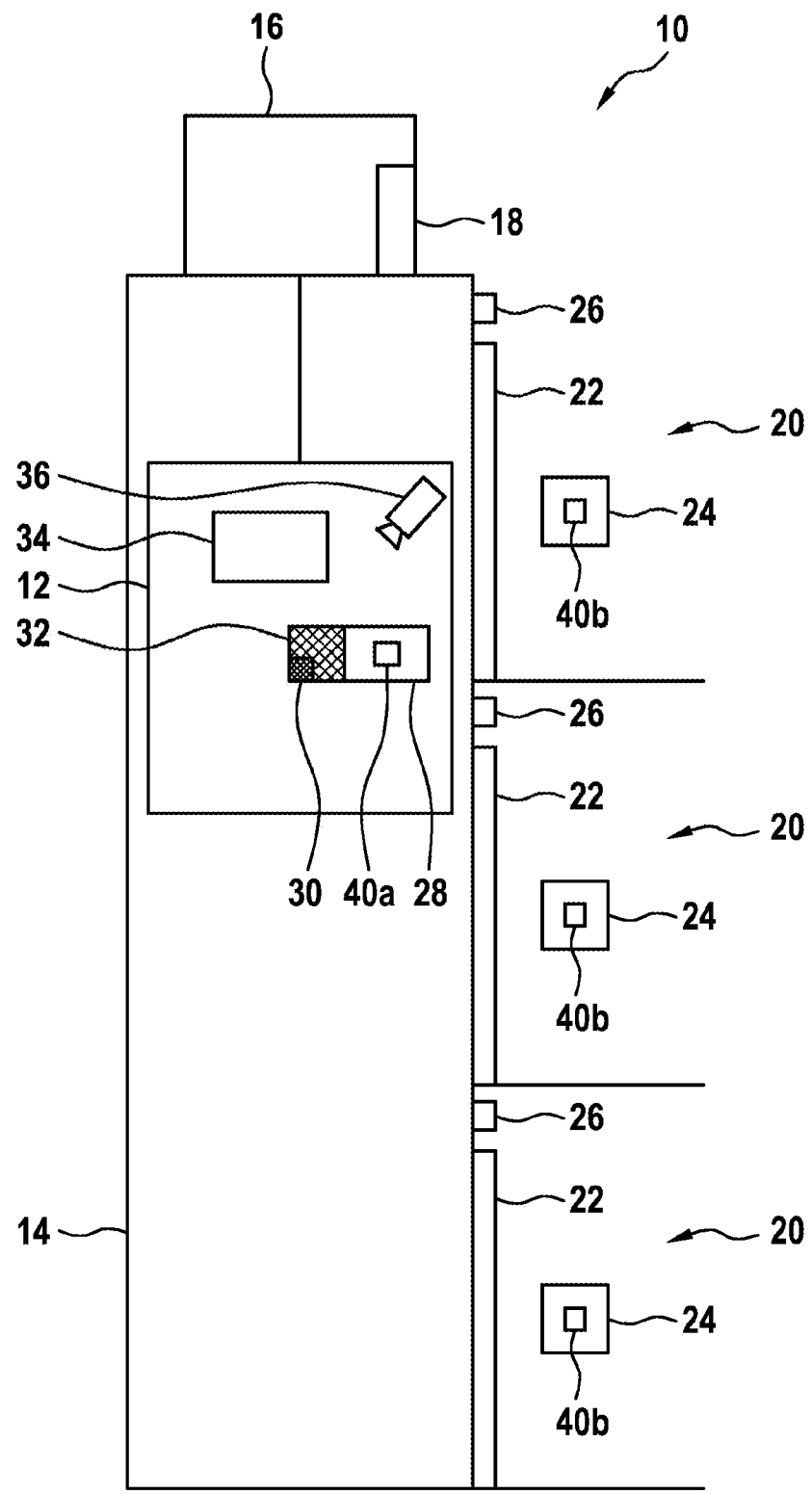
FIG. 1 schematically shows an elevator system according to an embodiment of the disclosure.

FIG. 1 shows an elevator system 10 with an elevator car 12 movable in an elevator shaft 14. The elevator car 12 is moved by a drive 16, for example an electrical motor, which is controlled by a central controller 18 of the elevator system 10. The elevator car 12 may be moved between a number of floors 20, each of which is provided with an elevator door 22 for getting access to the elevator car 12, when the elevator car 12 is on the respective floor 20.

The elevator system 10 comprises numerous devices for interactions with persons. In every floor 20, a door control panel 24 is attached near the respective elevator door 22. With the door control panel 24, which may comprise one or more buttons, the elevator car 12 may be called to the respective floor. Furthermore, a display panel 26 may be attached near and/or over the elevator door 22, which may display the current position of the elevator car 12.

Inside the elevator car 12, also a control panel 28 may be attached, which may comprise several buttons for selecting the floor 20 to which the elevator car 12 may move. Furthermore, the control panel 28 may provide a microphone 30 and a loudspeaker 32, which, for example, may be used for human communication with an operator. A display 34 inside the elevator car 12 may show the actual floor. Also, a security camera 36 may be provided inside the elevator car 12. It may be possible that such microphones 30, loudspeakers 32 and/or cameras 36 are also provided in every floor 20.

Figure 2:
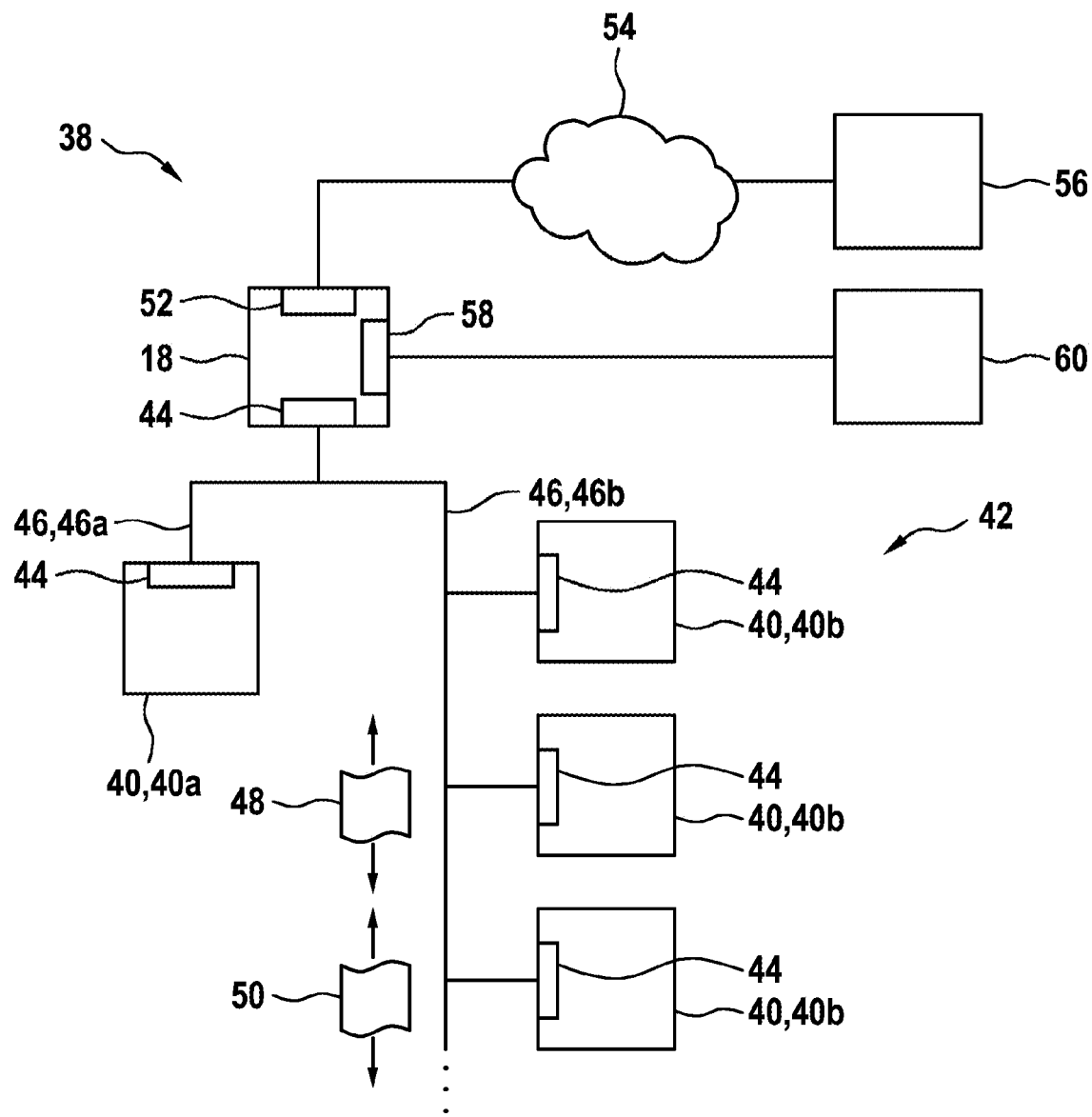
FIG. 2 schematically shows a control system for the elevator system of FIG. 1.

FIG. 2 shows a control system 38 for the elevator system 10. The control system 38 comprises the central controller 18 and a plurality of local controllers 40. For example, the local controller 40a may be the controller of the elevator control panel 28 and/or may be interconnected with the display 34 and/or the camera 36 inside the elevator car 12. It also may be possible that there are more than one local controller 40a inside the elevator car 12. For example, there may be an extra local controller 40a for the camera 36 and/or for the display 34.

Each of the local controllers 40b may be associated with a floor 20. For example, the local controllers 40b may be the controllers of the door control panels 24 and/or the display panels 26. It also may be that a local controller 40b is a controller for an elevator door 22. It may be that there are more than one local controller 40b in every floor 20. For example, there may be a separate local controller 40b for a security camera in every floor.

The local controllers 40 and the central controller 18 are interconnected with a real-time data connection network 42. The data connection network 42 may comprise one or more fieldbuses 46, for example one fieldbus 46a for interconnecting the local controller(s) 40a of the elevator car 12 with the central controller 18 and/or one fieldbus 46, 46b for interconnecting the local controllers 40b distributed along the elevator shaft 14 with the central controller 18. For connecting the controllers 18, 40 with the fieldbuses 46, every controller 18, 40 comprises an embedded communication device 44, which is adapted for encoding data into data packets, to transmit these data packets via the real-time data connection network 42 and for decoding the data packets back into the original data. The real-time data communication network 42 may be characterized in that it ensures that a data packet is always transmitted to the receiver and that the data packet is transmitted during a maximal transmission time. In this way, a sender may rely on that its information (in particular control data and/or sensor data) will arrive before a specific time limit.

All the data in the control system 38 may be transmitted via the real-time data connection network 42. The data may be differentiated into two types of data: The controllers 18, 40 exchange control and/or sensor data 48, which is used for controlling the elevator system 10 and media data 50, which may be seen as human communication data, e.g., data that may be produced by a human being during communication, for example by speaking and/or that may be transformed into signals directly perceivable by a human being such as sound, images and videos.

As an example, a local controller 40b of a door control panel 24 may transmit an indication (e.g., sensor data) that the elevator door is closed to the central controller 18. The local controller 40a of the car control panel 28 may transmit the selected floor to the central controller 18. During the same time, a local controller 40a receiving a signal from the camera 36 may transmit a video stream (e.g., media data) of the interior of the elevator car 12 to the central controller 18.

The central controller 18 may furthermore comprise a gateway 52 for communication with the Internet 54. For example, the central controller 18 may transmit media data 50 (such as the above-mentioned video stream) to an external server 56. It also may be possible that media data 50 is downloaded from the Internet 54 by the central controller 18 and transmitted to the local controllers 40a, 40b, for example for displaying a video stream on the display 34 and/or for playing music on the loudspeaker 32.

The central controller 18 furthermore may be connected via an additional gateway 58 with a building network 60, which, for example, may receive media data 50, such as a video stream of the interior of the elevator car 12. Such a video stream, for example, may be used in a security system of the building, which houses the elevator system 10.

It may be that the sensor and/or control data 48 is transmitted directly via the protocol of the real-time data communication network 42. For example, sensor signals, such as from a door closed sensor, may be digitized and directly transmitted to the respective receiver via the embedded communication devices 44. Also control data may be encoded directly into the data packets sent via the real-time data communication network 42.

Also, the media data 50 may be transmitted directly with the data packets of the real-time data communication network 42. However, it may be beneficial to encode the media data 50 in data packets of a higher protocol layer. For example, an Internet connection based on an Internet protocol may be established between the controllers 18, 40 with the aid of the real-time data communication network 42. The media data 50 then may be sent via the Internet connection.

As an example, a VoIP connection may be established between the local controller 40*a* and an external server 56. The local controller 40*a* may receive a voice signal from the microphone 30, may encode this signal into voice data and may transmit this voice data to the central controller via the real-time data communication network 42. The central controller 18 then may forward the voice data to the external server 56. Voice data received by the central controller 18 from the external server 56 will be sent by the central controller 18 to the local controller 40*a* via the real-time data communication network 42. The local controller 40*a* may then decode the voice data and may output the corresponding signal with the loudspeaker 32.

Figure 3:
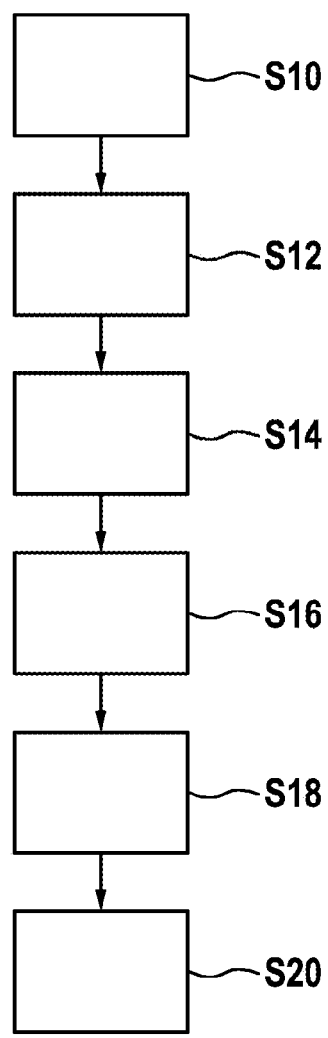
FIG. 3 shows a flow diagram for a method for controlling the elevator system of FIG. 1.

FIG. 3 shows a flow diagram of a method that may be performed by the control system 38.

In step S10, control and/or sensor data 48 is generated and/or received in one of the controllers 18, 40.

For example, a person may push a button of the elevator car control panel 28 for selecting a floor 20 or the person may push the button of the door control panel 24 to call the elevator car. In any case, the local controller 40*a*, 40*b* of the corresponding panel 24 may generate a corresponding control signal, which is digitized into control data 48.

It also may be possible that a door open sensor generates a signal that the corresponding door 22 is closed. A or the door control panel 24, which also may provide a controller 40*b* for the door 22 may digitize the sensor signal into sensor data 48.

In another case, the central controller 18 generates control data, which, for example, is intended for the elevator car, such as a command to open the door.

In the end, the control and/or sensor data 48 is received in the corresponding embedded communication device 44 of the local controller 40*a*, 40*b* or the central controller and encoded into one or more data packets.

In step S12, the control and/or sensor data 48 is transmitted via the real-time data communication network 42 to a receiving controller 18, 40 and in particular to an embedded communication device 44 of the receiving controller. The one or more data packets are received by the corresponding embedded communication device 44, which encodes them and provides the decoded control and/or sensor data 48 to the receiving controller.

In the case, the central controller 18 and/or the local controller 40 is sending data (such as control and/or sensor data 48), the corresponding controller 18, 40 may be seen as sending controller and the corresponding embedded communication device 44 may be seen as sending embedded communication device. On the other hand, when the central controller 18 and/or the local controller 40 is receiving data (such as control and/or sensor data 48), the corresponding controller 18, 40 may be seen as receiving controller and the corresponding embedded communication device 44 may be seen as receiving embedded communication device.

For example, the above-mentioned information about a button push, floor selection and/or call to floor may be received encoded in a data packet in the central controller 18. The embedded communication device 44 of the central controller 18 may decode the data and the controller 18 may further process this data.

Also, sensor data 48 from a local controller 40 (such as a door closed signal) may be received in the central controller 18 in the form of a data packet, decoded by the embedded communication device 44 and further processed by the central controller 18.

In step S14, media data 50 is generated and/or received in one of the controllers 18, 40.

For example, the elevator car control panel 28 may receive a video signal from the camera 36 and/or may receive a voice signal from the microphone 30. In the latter case, it may be that a person, which is standing inside the elevator car 12, may have pushed a button to call an operator, for example in case of an emergency. After the button push, the elevator car control panel 28 may establish a VoIP connection with an external server 56, such that the person can speak with a person provided by the operator.

It also may be that such a camera 36 is provided in one or more of the floors 20 and/or that a person may speak into a microphone provided by a door control panel 24.

In any case, the corresponding media signal may be encoded into media data (such as voice data, sound data, image data, video data, etc.) and provided to the corresponding embedded communication device 44, which encodes it into one or more data packets.

A further possibility is that media data, which, for example, may already be stored in the central controller 18 (for example a video file, a music file, etc.), which is to be sent to a local controller 40, is provided to the embedded communication device 44.

In step S16, the media data is transmitted via the real-time data communication network 42 to a receiving controller 18, 40 and in particular to a receiving embedded communication device 44. The one or more data packets are received by the corresponding embedded communication device 44, which encodes them and provides the decoded media 50 to the receiving controller.

It has to be noted that media data 50 and sensor and/or control data 48 may be transmitted via the real-time data communication network 42 simultaneously, e.g., data packets with sensor and/or control data 48 and data packets with media data 50 may be transmitted interleaved with each other.

It also may be that media data 50 is transmitted via an Internet connection built on top of the protocol of the real-time data communication network 42. To this end, an Internet connection may be established via the real-time data communication network by the corresponding controllers 18, 40. For example, a VoIP connection may be established via an Internet connection.

For example, the video or image data 50 from a camera 36 may be received in the central controller 18, which, for example, may forward these media data 50 to the building network 60. Also voice data 50 of a VoIP connection may be transmitted from the central controller 18 to a local controller 40.

In step S18, the door control panel 24 and/or the elevator car control panel 28 displays image data 50 and/or video data 50 and/or plays voice data 50 and/or sound data 50 received via the real-time data communication network 42. It also may be that media data 50 containing music and/or a video is transmitted to the elevator car 12 and/or to corresponding panels 24, 26, 28 played there, for example with the loudspeaker 32 and/or the display 34.

In step S20, media data 50 from a local controller 40, which was transmitted via the real-time data communication network 42, is sent by the central controller 18 into the Internet 54. It also may be that the central controller receives media data 50 from the Internet and forwards this media data 50 to a local controller 40.

The central controller 18 may comprise an Internet gateway 52 for receiving media data 50 from the Internet 54 and/or for sending media data 50 into the Internet 54.

For example, in the case of a VoIP connection between a local controller and an external server 56, the central controller 18 may forward the corresponding voice data 50 either from the external server 56 to the local controller 40 and from the local controller 40 to the external server 56.

It also may be that a video stream from the Internet 54 is played with a display 34 (for example inside the elevator car 12) with a corresponding display in one of the floors 20. In this case, the central controller 18 may receive the corresponding Internet data packets and may either forward them via an Internet connection to the corresponding local controller 40. It also may be that the Internet data packets are decoded by the central controller 18 and that the decoded media data 50 is transmitted via the real-time data communication network 42 directly with the protocol of the real-time data communication network 42.

Finally, it should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

The invention claimed is:

1. A method for controlling an elevator system, the method comprising:
    receiving, by a first controller of the elevator system, media data, wherein the first controller comprises one of a local controller provided in an elevator car, a local controller of a door panel, or a central controller adapted for controlling a drive of the elevator system;
    encoding, by the first controller, the media data into one or more encoded media data packets
    receiving, by the first controller, at least one of control data and sensor data;
    encoding, by the first controller, the at least one of control data and sensor data into one or more encoded control or sensor data packets;
    transmitting, by the first controller, the one or more encoded media data packets interleaved with the one or more encoded control data sensor packets via a real-time data communication network to a second controller of the elevator system, wherein the second controller comprises another of a local controller provided in an elevator car, a local controller of a door panel, or a central controller adapted for controlling a drive of the elevator system;
    wherein the real-time data communication network is adapted for transmitting the one or more encoded media data packets interleaved with the one or more encoded control data sensor packets while ensuring that each data packet of the one or more encoded media data packets interleaved with the one or more encoded control data sensor packets is transmitted during a maximal transmission time.

2. The method of claim 1, wherein an Internet connection is established via the real-time data communication network and the media data is transmitted via the Internet connection.

3. The method of claim 1, wherein the media data comprises at least one of sound data, voice data, image data, video data.

4. The method of claim 1, wherein the media data is generated in the elevator car and transmitted from the local controller of the elevator car control panel to the central controller; and/or wherein media data is generated by the door control panel and transmitted from the local controller of the door control panel to the central controller.

5. The method of claim 1, wherein the control data and/or sensor data is generated in the elevator car and transmitted from the local controller of the elevator car control panel to the central controller; and/or wherein the control data or sensor data is transmitted from the local controller of the door control panel to the central controller; and/or wherein the control data is generated by the central controller and transmitted to the local controller of the door control panel and/or the elevator car control panel.

6. The method of claim 1, wherein the media data is received or generated by the central controller and transmitted to the local controller of the door control panel and/or the elevator car control panel; and/or wherein the central controller comprises an Internet gateway for receiving media data from the Internet and/or for sending media data into the Internet.

7. The method of claim 1 wherein media data from a local controller transmitted via the real-time data communication network is sent by the central controller into the Internet.

8. The method of claim 1, wherein the door control panel or the elevator car control panel displays image data or video data received via the real-time data communication network.

9. The method of claim 1, wherein the door control panel or the elevator car control panel plays voice data or sound data received via the real-time data communication network.

10. The method of claim 1, wherein voice data and/or sound data is encoded from a signal of a microphone; and/or wherein image data and/or video data is encoded from a signal of a camera.

11. The method of one claim 1, wherein the real-time communication network is an etherCAT or a PROFInet-IRT network.

12. A control system of an elevator system, wherein the control system is adapted for performing the method of claim 1, the control system comprising:
    a central controller adapted for controlling a drive of the elevator system;
    at least one local controller being provided in at least one of an elevator car control panel and a door control panel; and
    a real-time data communication network interconnecting the central controller and the local controller.

13. An elevator system, comprising:
an elevator car movable in an elevator shaft and driven by a drive;
an elevator car control panel;
at least one door control panel at an elevator door;
a control system according to claim 12.

14. The elevator system of claim 13,
wherein the real-time data communication network comprises a fieldbus interconnecting the central controller with a local controller in the elevator car.

15. The elevator system of claim 13,
wherein the real-time data communication network comprises a fieldbus interconnecting the central controller with a plurality of door control panels.

* * * * *

UNITED STATES PATENT AND TRADEMARK OFFICE
CERTIFICATE OF CORRECTION

| | | |
|---|---|---|
| PATENT NO. | : 12,065,329 B2 | |
| APPLICATION NO. | : 16/478423 | |
| DATED | : August 20, 2024 | |
| INVENTOR(S) | : Stefano Carriero | |

It is certified that error appears in the above-identified patent and that said Letters Patent is hereby corrected as shown below:

In the Specification

In Column 3, Line 19, delete "the the" and insert --the--.

In Column 3, Line 22, delete "the the" and insert --the--.

In Column 4, Lines 47-48, delete "PROFInet-IR©" and insert --PROFInet-IRT©--.

In the Claims

In Column 10, Claim 7, Line 38, delete "1" and insert --1,--.

In Column 10, Claim 11, Line 55, delete "one claim" and insert --claim--.

In Column 10, Claim 11, Lines 56-57, delete "etherCAT" and insert --EtherCAT--.

Signed and Sealed this
Twenty-ninth Day of October, 2024

Katherine Kelly Vidal
*Director of the United States Patent and Trademark Office*